United States Patent
Menovcik et al.

[11] Patent Number: 5,876,493
[45] Date of Patent: *Mar. 2, 1999

[54] STABILIZATION OF INORGANIC PIGMENTS IN AQUEOUS MEDIA

[75] Inventors: Gregory G. Menovcik, Farmington Hills; Thomas C. Balch, West Bloomfield; Hilary P. Davis, Utica; Paul Dudek, Dearborn, all of Mich.

[73] Assignee: BASF Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 552,815

[22] Filed: Nov. 3, 1995

[51] Int. Cl.$^6$ .................................................. C09C 1/36
[52] U.S. Cl. .................. 106/445; 106/311; 106/404; 106/432; 106/453; 106/456; 106/459
[58] Field of Search ..................... 106/445, 404, 106/311, 456, 459, 453, 432

[56] References Cited

U.S. PATENT DOCUMENTS

| | | | |
|---|---|---|---|
| 3,996,059 | 12/1976 | Stansfield et al. | 106/413 |
| 4,183,843 | 1/1980 | Koenig et al. | 523/216 |
| 4,720,514 | 1/1988 | Needham | 523/351 |
| 4,752,532 | 6/1988 | Starka | 428/482 |
| 4,791,168 | 12/1988 | Salatin et al. | 524/601 |
| 5,025,061 | 6/1991 | Ishidoya et al. | 525/444 |
| 5,312,877 | 5/1994 | Avci et al. | 525/444 |
| 5,374,691 | 12/1994 | Hintze-Brüning et al. | 525/443 |
| 5,397,391 | 3/1995 | Stramel | 106/447 |
| 5,484,842 | 1/1996 | Lewarchik et al. | 524/608 |
| 5,549,929 | 8/1996 | Scheibelhoffer et al. | 427/282 |
| 5,554,682 | 9/1996 | Harris et al. | 524/523 |
| 5,597,861 | 1/1997 | Nakae et al. | 524/601 |

Primary Examiner—Mark L. Bell
Assistant Examiner—Scott L. Hertzog
Attorney, Agent, or Firm—Anne Gerry Sabourin

[57] ABSTRACT

A method for stabilizing inorganic pigments in aqueous media and waterborne coating compositions is provided. The method comprises forming a pigment treatment composition of a polyester havng an acid number between 15 mg KOH/g and 50 mg KOH/g or a phosphate ester or pyrophosphate ester, having an acid number between 10 mg KOH/g and 50 mg KOH/g, solvent, and an amino functional resin. The composition is then deposited on the pigment. The treated pigment is stable in an aqueous environment and is suitable for waterborne coating compositions.

15 Claims, 1 Drawing Sheet

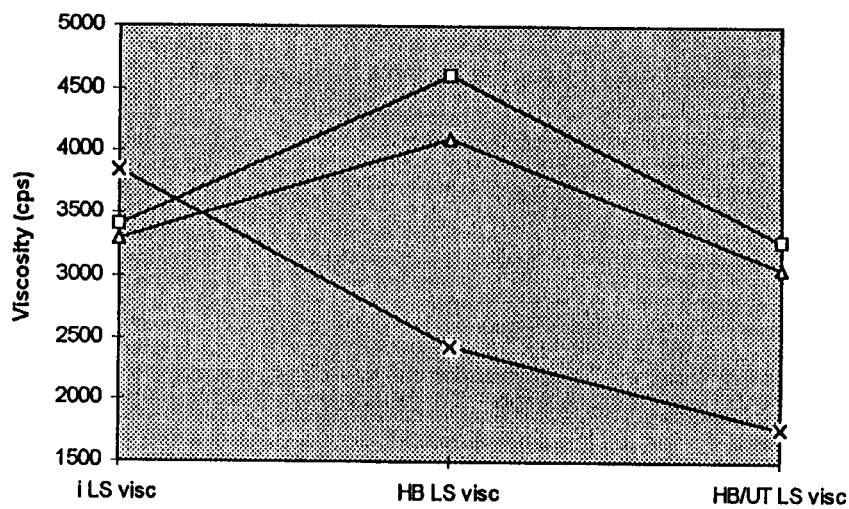

□ Basecoat composition Ti O$_2$ pigment paste prepared according to example 2A, ground in pot mill △ Basecoat composition Ti O$_2$ pigment paste prepared according to example 2A, ground in horizontal mill x Control- TiO$_2$ ground in acrylic resin, no treatment prior to introducing into coating composition.

iLs visc = initial low shear viscosity

HB LS visc = hot box low shear viscosity

HB/UT LS visc= hot box/ultraturex low shear viscosity

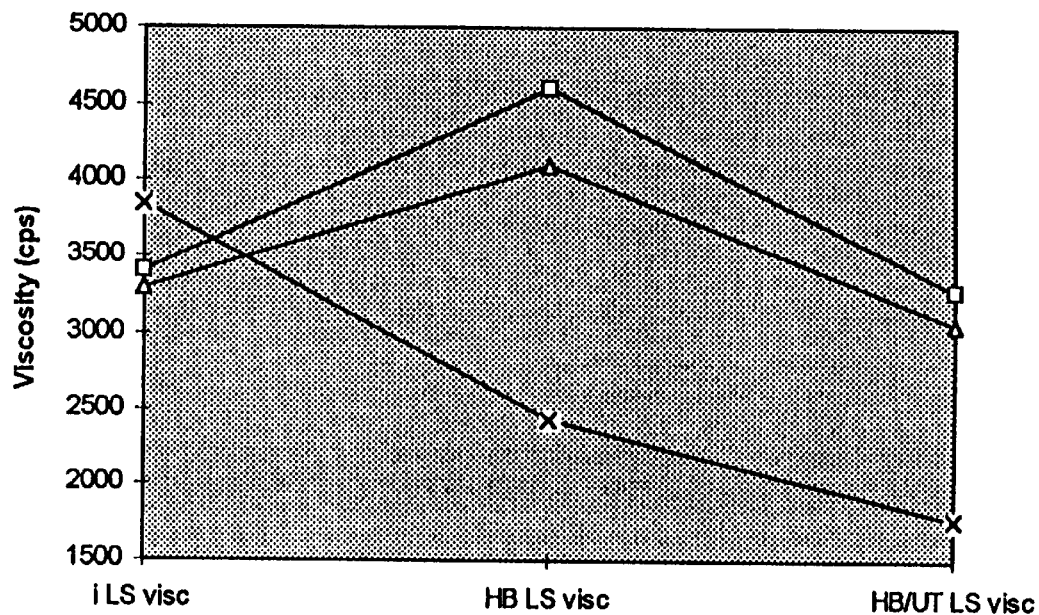

☐ Basecoat composition Ti O₂ pigment paste prepared according to example 2A, ground in pot mill △ Basecoat composition Ti O₂ pigment paste prepared according to example 2A, ground in horizontal mill ✕ Control- TiO₂ ground in acrylic resin, no treatment prior to introducing into coating composition.

iLs visc = initial low shear viscosity

HB LS visc = hot box low shear viscosity

HB/UT LS visc= hot box/ultraturex low shear viscosity

Figure 1

STABILIZATION OF INORGANIC PIGMENTS IN AQUEOUS MEDIA

BACKGROUND OF THE INVENTION

1. Field of the Invention

The present invention relates to stabilization of inorganic pigments in aqueous media. More specifically the invention relates to stabilization of inorganic pigments with acid functional polyester resins or phosphate esters.

2. Description of the Related Art

Inorganic pigments are included in waterborne coating compositions as the pigment provides desirable color effects. Various problems are encountered in waterborne coatings containing these pigments, when the pigments are utilized without stabilization. These problems include gassing or oxidation of the inorganic pigments when the pigment is exposed to an aqueous environment. The pigment reacts with water to produce hydrogen gas and a metal hydroxide. The reaction is a form of corrosion. The amount of corrosion is measured by the amount of hydrogen gas produced over a given period of time. Corrosion is exacerbated since the reaction results in the continuous formation of $H^+$ and $OH^-$ ions. The $H^+$ ions attack and corrode the pigment and the $OH^-$ ions cause the pH of the environment to further increase. In coating compositions, contact of the inorganic pigment with the aqueous environment is continuous over extended periods of time, since coatings containing the pigment are often stored for 6 months or more before use.

Gassing of the inorganic pigment causes a loss of viscosity of the coating composition and consequent loss of metal control in the coating composition. The result is often a cured film exhibiting a gray color, rather than the desired bright metallic appearance.

An object of the present invention is treatment of inorganic pigment to reduce or eliminate pigment gassing, when the pigment is used in an aqueous environment or in a waterborne coating composition.

SUMMARY OF THE INVENTION

The present invention is a method for stabilizing inorganic pigments in aqueous media, and the treated pigments obtained thereby. The method of the present invention is effective for stabilizing inorganic pigments in waterborne coating compositions.

The method for treating the pigment comprises, first, forming a pigment treatment composition comprising either a polyester resin having an acid number between 15 mg KOH/g and 50 mg KOH/g, or a phosphate or pyrophosphate ester resin having an acid number between 10 mg KOH/g and 50 mg KOH/g, or a mixture thereof. To this resin is added an aminoplast resin, and solvent. The pigment is treated with the pigment treatment composition, by means of spraying, grinding or milling the pigment with the treatment composition, to form the treated pigment. Preferably, the pigment is ground or milled with the pigment treatment composition to form a pigment paste or pigment dispersion.

A coating composition may be formed by adding a treated pigment, as described above, to a principal resin, and optionally adding solvents, pigments, catalysts, hindered amine light stabilizers, ultraviolet light absorbers, rheology control additives and other additives known to those skilled in the art.

DESCRIPTION OF THE DRAWING

FIG. 1 illustrates comparative viscosities of coatings prepared with and without treated pigment.

DETAILED DESCRIPTION OF THE INVENTION

The present invention is a method for treating inorganic pigments to inhibit gassing of the pigment in an aqueous media. The pigment is treated by spraying, milling or grinding the pigment with a mixture of polyester having an acid number between 15 and 50 mg KOH/g or phosphate or pyrophosphate ester having an acid number between 10 and 50 mg KOH/g, or a mixture of these resins, and aminoplast resin and solvent.

Suitable polyester polymers for purposes of the present invention are those prepared from polyfunctional acids and polyhydric alcohols, wherein the polyester has an acid number between 15 and 50 mg KOH/g. Preferably the polyester is a branched chain polyester.

Examples of acids used to prepare the polyester include mono, di-, or higher functionality carboxylic acids having carbon chain lengths of 18 or fewer carbon units, as well as longer carboxylic acids, (e.g., C36 dimer fatty acids). It is preferable that the carboxylic acid have two or more carboxylic acid groups. Useful dicarboxylic acid compounds include adipic acid, oxalic acid, malonic acid, succinic acid, glutaric acid, pimelic acid, maleic acid, azeleic acid, sebacic acid, perfluoroazelaic acid and fumaric acid. Aromatic dicarboxylic acids are also preferred. Examples of these acids include isophhalic acid, phthalic acid. Alkylene and aralkylene carboxylic acids can also be used. For purposes of the present invention branched chain polyesters are preferred, and are provided by including an acid compound containing three or more carboxylic acid groups, for example citric acid or trimellitic anhydride.

The polyester resins are synthesized from the above-described carboxylic acid component and a polyol component.

The polyester resin may be terminated by hydroxy functionality, acid functionality or hydroxy-acid functionality.

Suitable polyols are 1,4-butanediol, 1,6-hexanediol, neopentyl glycol, ethylene glycol, propylene glycol, diethylene glycol, dipropylene glycol, butylene glycol, glycerol, hydrogenated bisphenol A, cyclohexane dimethanol, caprolactaone diol (i.e., the reaction product of caprolactone and ethylene glycol), hydroxyalkylated bisphenols, trimethylolpropane, pentaerythritol, 2,2,3,3,4,4-hexafluoro-1,5-pentanediol and sorbitol. Suitable alcohols include alcohols derived from fatty alcohols. Particularly preferred are dimer fatty alcohols. For purposes of the present invention, a mixture of 1,6-hexane diol and dimer fatty alcohols is preferred.

The polyester resin in most cases is comprised of one or more polyols, preferably a diol. It may be desirable to include polyols having three or more hydroxy groups, to provide a branched polyester. There may be a small amount of monoalcohol present in the polyol component, particularly if larger proportions of higher functional alcohols are used. These monoalcohols serve as chain terminators. In certain instances, for example, where certain high molecular weight polyols are used, the polyols can be largely or even entirely made up of compounds of functionality greater than two.

Also suitable for purposes of the present invention are phosphate esters and pyrophosphate esters. The phosphate and pyrophosphate esters suitable for purposes of the present invention have the formulae:

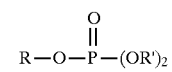

and

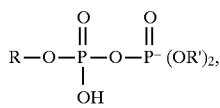

respectively. In these formulae R represents a monovalent lower alkyl radical containing from 1 to 15 carbon atoms, R' is hydrogen, or a hydrocarbon radical selected from the group consisting of monovalent lower alkyl radicals containing from 1 to 10 carbon atoms, or a phenyl radicals. Preferred phosphate and pyrophosphate esters include trialkyl phosphates, tricresyl phosphate, phosphites, and esters of phosphoric and phosphorous acid. Examples of these include, isodecyl diphenyl phosphate; tributoxyethyl phosphate; and the phosphate ester of a diethylamine and phosphoric acid, where the diethyl amine is 2-hexyloxyethyl ester diethylamine salt, diethylamine or a mixture of the two.

Aminoplast resins suitable for purposes of the present invention are aldehyde condensation products of melamine, urea, and similar compounds. Products obtained from the reaction of formaldehyde with melamine, urea or benzoguanamine are most common and are preferred. However, condensation products of other amines and amides can also be employed, for example, aldehyde condensates of triazines, diazines, triazoles, guanidines, guanamines and alkyl- and aryl-substituted ureas and alkyl- and aryl-substituted melamines. Some examples of such compounds are N,N-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diaminopyrimidine, 2,4,6-triethyltriamino-1,3,5-triazine, and the like.

While the aldehyde employed is most often formaldehyde, other similar condensation products can be made from other aldehydes, for example, acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols, as methanol, ethanol, propanol, butanol, pentanol, hexanol, heptanol and others, as well as benzyl alcohol and other aromatic alcohols, cyclic alcohols for example cylohexanol, monoethers of glycols such as Cellosolves and Carbitols™ (Union Carbide), and halogen-substituted or other substituted alcohols, such as 3-chloropropanol. The preferred amine-aldehyde resins are etherified with methanol or butanol.

Inorganic pigments suitable for the present invention include titanium dioxide, ferrous pigments, chromium pigments such as chromium oxide, zinc chromate, lead chromate, lead pigments, zinc pigments, antimony oxide, cadmium sulfide, cadmium selenide, and nickel titanate. The present invention is particulary useful for the inorganic oxide pigments of iron, chromium, lead and titanium dioxide. The present invention is also useful for inorganic pigments treated with aluminum oxide.

Suitable solvents for purposes of the present invention include butyl cellosolve, n-propoxy propanol, sold under the trademark Propyl Proposol®, propylene glycol monomethyl ether and propylene glycol monobutyl ether.

The pigment treatment composition is applied to one or more inorganic pigments by spraying or otherwise mixing the treating agent with the pigment. The treatment can be applied by the addition of the treating agent to the intensified bar of a V-blender or by spraying the treating agent into a screw conveyor or paddle mixer containing the pigments. In a preferred embodiment, the pigment treatment composition and the inorganic pigment are mixed together and the pigment is ground using a horizontal mill or other suitable mill, to form a pigment paste or pigment dispersion. The pigment dispersion may then be added to a principal resin to form a coating composition.

A pigment dispersion is prepared by combining the polyester or phosphate or pyrophosphate ester, or a mixture of these esters, aminoplast resin, solvent and one or more pigments. The polyester, pyrophosphate ester, or phosphate ester is used in an amount between 25.0 and 50.0% by weight, preferably between 30 and 40% by weight. The amino functional resin is used in an amount between 5.0 and 25.0% by weight, preferably between 10.0 and 20.0% by weight. Inorganic pigment is used in an amount between 10.0 and 45.0% by weight, preferably in an amount between 25 and 35% by weight. Solvent is included in an amount between 10.0 and 30.0%, preferably between 10.0 and 20.0% by weight, where all weights are based on total pigment dispersion weight.

A waterborne coating composition is formed from the treated pigment of the present invention, by combining the pigment with a principal resin. Preferably, the pigment is added to the principal resin in the form of a pigment dispersion as described in the preceding paragraph. A neutralizing agent may be added to enhance the water dispersibility of the pigment paste. Suitable neutralizing agents include dimethylethanol amine and aminomethyl propane. The principal resin may be any polymeric resin such as acrylic resins, epoxy resins, amine modified resins, phenolic resins, saturated and unsaturated polyester resins, urea resins, urethane resins, blocked isocyanate resins and mixtures thereof.

The reduced gassing of the pigment is achieved by treating the pigment prior to its introduction to a coating composition. The desired reduction in gassing of the pigment is not accomplished by adding the pigment treatment composition to the coating composition containing pigment.

Other additives may be added to the coating composition, including solvents, pigments, catalysts, hindered amine light stabilizers, ultraviolet light absorbers, rheology control additives, crosslinking agents and other additives known to one skilled in the art.

Waterborne basecoat compositions containing the inorganic pigments treated according to the present invention exhibited decreased gassing of the inorganic pigment and improved rheology control, in contrast to waterborne basecoat compositions utilizing the pigments without the treatment. FIG. 1 illustrates the improved rheology control, as it shows the viscosity of the coatings containing the treated pigments increases in comparison to the coating with untreated pigments.

FIG. 1 illustrates the initial low shear viscosity, (iLS visc); a low shear viscosity of samples following a hot box treatment (HB LS visc); and a low shear viscosity following hot box treatment and subsequent Ultraturrax® treatment (HB/UT LS visc). All low shear viscosity readings were measured on a Brookfield® viscometer at a shear of 2 sec$^{-1}$. The initial low shear viscosity (iLS visc) was measured before the coating was subjected to any treatment procedures.

The hot box low shear viscosity (HB LS visc) was measured after the waterborne basecoat sample, prepared according to Example 3, was subjected to hot box testing. The hot box test is conducted by adjusting the pH to 8.0 with dimethyl ethanol amine. The viscosity is measured at high shear of 426 sec$^{-1}$ on the Brookfield® viscometer. The basecoat is adjusted to spray viscosity with deionized water and high shear viscosity is measured again. The basecoat sample is then subjected to high shear at 8000 RPM, in a high shear apparatus such as an Ultraturrax®. The high shear apparatus serves to activate the rheology control agent. The basecoat sample is then placed in a 110° F. oven for 5 days. The samples then are allowed to cool to room temperature. Viscosity measurements are then performed. The (HB LS visc) in FIG. 1, indicates the viscosity measured at this point.

For samples subjected to the Hot Box and treatment in the Ultraturrax® (HB/UT LS visc), following removal from the oven, the sample was subjected to high shear in an Ultraturrax® again, and the viscosity was then measured. FIG. 1 illustrates the viscosity following the second treatment in an Ultraturrax® processor.

The present invention is further illustrated by the following non-limiting examples.

EXAMPLES

Example 1

Polyester Polymer

| Description | Amount |
|---|---|
| DIMER FATTY ACID | 29.06 |
| HEXANE DIOL | 28.54 |
| ISOPHTHALIC ACID | 8.30 |
| TOLUENE | 1.21 |
| TRIMELLITIC ANHYDRIDE | 11.16 |
| DIMETHYL ETHANOL AMINE | 0.01 |
| BUTYL ALCOHOL | 12.07 |
| N-PROPOXY PROPANOL | 9.65 |
| Total | 100.0 |

Example 2

Pigment Grind Resin Formulations

| | Example | | | |
|---|---|---|---|---|
| Ingredient | Ex. 2A | Ex. 2B | Ex. 2C | Ex. 2D |
| Polyester Resin from Ex. 1 | 40.00 | 30.61 | 40.00 | 35.00 |
| Melamine Resin$^a$ | 15.00 | 15.00 | 15.00 | 19.06 |
| Polyether grafted acrylic | — | 13.51 | — | — |
| n-propoxy proposol | 15.00 | 10.88 | 14.42 | 15.94 |
| Titanium Dioxide Pigment | 30.00 | 30.00 | 30.00 | 30.00 |
| Dimethylethanol amine | — | — | 0.58 | — |
| Total | 100.00 | 100.00 | 100.00 | 100.00 |

$^a$High imino fully methylated melamine resin, available under the trademark Cymel ® 327 from Cytec.

Example 3

Basecoat Formulation with Treated Titanium Dioxide Pigment

| INGREDIENT | AMOUNT (% By Weight based on total coating composition weight) |
|---|---|
| Rheology Control Agent$^1$ | 25.32 |
| Melamine Resin$^2$ | 3.02 |

-continued

Basecoat Formulation with Treated Titanium Dioxide Pigment

| INGREDIENT | AMOUNT (% By Weight based on total coating composition weight) |
|---|---|
| Polyurethane Resin | 37.14 |
| TiO$_2$ Pigment Dispersion (Ex. 2A) | 4.47 |
| Black pigment dispersion | 0.62 |
| White pigment dispersion | 0.27 |
| Red pigment dispersion | 0.22 |
| Ultraviolet Light Absorber | 0.34 |
| Flow Control Agent | 0.86 |
| Aluminum Slurry | 17.23 |
| Dimethyl ethanol amine | 0.04 |
| n-propoxy propanol | 0.69 |
| Deionized water | 9.78 |
| Total | 100.00 |

$^1$Rheology Control agent is a 3.5% Laponite solution
$^2$Melamine resin is Cymel 327 from American Cyanamid, of Wayne, New Jersey.

We claim:
1. A method for reducing or eliminating gassing of inorganic pigments in an aqueous media, comprising the steps of
   a) forming a pigment treatment composition comprising
      i) a resin selected from the group consisting of polyester resins having an acid number between 15 mg KOH/g and 50 mg KOH/g, and phosphate or pyrophosphate ester resins having an acid number between 10 mg KOH/g and 50 mg KOH/g, and mixtures thereof, and
      ii) an aminoplast resin, and
      iii) a solvent, and
   b) combining the pigment treatment composition with inorganic pigment to form a treated pigment comprising from between 25.0 and 50.0% by weight of resin (i), between 5.0 and 25.0% by weight of aminoplast resin (ii), from between 10 to 30% by weight of solvent (iii), and between 10 and 45.0% by weight inorganic pigment, all weights being based on total treated pigment weight.

2. A method for reducing or eliminating gassing of inorganic pigments in aqueous coating compositions comprising
   a) forming a pigment treatment composition comprising
      i) a resin selected from the group consisting of polyester resins having an acid number between 15 and 50 mg KOH/g, and phosphate and pyrophosphate ester resins having an acid number between 10 and 50 mg KOH/g, and mixtures thereof and
      ii) an aminoplast resin,
   b) combining the pigment treatment composition and inorganic pigment to form a treated pigment, and
   c) adding the treated pigment to an aqueous coating composition having a principal resin that is not the same as resin (i).

3. The method of claim 2, further comprising the step of
   d) adding to the coating composition, either before or after addition of the addition of the treated pigment, compounds selected from the group consisting of solvents, additional pigments, catalysts, hindered amine light stabilizers, ultraviolet light absorbers, flow control additives, crosslinking agents in addition to the aminoplast component ii), rheology control additives, and mixtures thereof.

4. The method of claim 1 or 2, wherein the polyester resin used to treat the pigment is a branched polyester resin comprising the reaction product of acid functional compounds selected from the group consisting of dimer fatty acid, isophthalic acid, phthalic acid, citric acid, the corresponding anhydrides thereof and mixtures thereof, and an alcohol selected from the group consisting of 1,4-butanediol, 1,6-hexanediol, neopentyl glycol, ethylene glycol, propylene glycol, diethylene glycol, dipropylene glycol, butylene glycol, butanol and mixtures thereof.

5. The method of claim 2, wherein the pigment treatment composition further comprises solvent.

6. The method of claim 1 or 2, wherein the aminoplast resin is a melamine resin.

7. The method of claim 2, wherein step b) comprises forming a pigment dispersion from the pigment and pigment treatment composition.

8. The method of claim 2, wherein the aminoplast resin is present in an amount between 15.0 and 25.0% by weight, based on total treatment composition weight.

9. The method of claim 7, wherein the pigment dispersion comprises between 1.0 and 20.0% by weight of the coating composition.

10. The method of claim 2, wherein the coating composition comprises a waterborne basecoat composition.

11. The method of claim 2, wherein the coating composition comprises a waterborne basecoat composition including a aluminum flake pigment.

12. An inorganic coated pigment having thereon a pigment treatment composition obtained by the process of claim 1.

13. An inorganic coated pigment having thereon a pigment treatment composition to reduce gassing of the pigment in an aqueous environment, the composition comprising
   i) a resin selected from the group consisting of polyester resins having an acid number between 15 mg KOH/g and 50 mg KOH/g, said polyester resin being terminated with hydroxy functionality, acid functionality, or hydroxy-acid functionality, and phosphate and pyrophosphate ester resins having an acid number between 10 mg KOH/g mg KOH/g and 50 mg KOH/g, and mixtures thereof,
   ii) an aminoplast resin, and
   iii) solvent.

14. An inorganic pigment, having thereon a surface treatment to reduce gassing of the pigment in an aqueous environment, wherein the treated pigment is obtained by
   a) forming a pigment treatment composition comprising
      i) a resin selected from the group consisting of polyester resins having an acid number between 15 mg KOH/g and 50 mg KOH/g said polyester resin being terminated with hydroxy functionality, acid functionality, or hydroxy-acid functionality, and phosphate or pyrophosphate ester resins having an acid number between 10 mg KOH/g and 50 mg KOH/g, and mixtures thereof, and
      ii) an aminoplast resin, and
      iii) solvent, and
   b) combining the pigment treatment composition with inorganic pigment.

15. An inorganic coated pigment having thereon a pigment treatment composition to reduce gassing of the pigment in an aqueous environment, the composition comprising
   i) a resin selected from the group consisting of polyester resins having an acid number between 15 mg KOH/g and 50 mg KOH/g, said polyester resin being terminated with hydroxy functionality, acid functionality, or hydroxy-acid functionality, and phosphate and pyrophosphate ester resins having an acid number between 10 mg KOH/g mg KOH/g and 50 mg KOH/g, and mixtures thereof,
   ii) an aminoplast resin, and
   iii) solvent;
wherein said inorganic coated pigment exhibits reduced oxidation when observed in an aqueous environment, relative to an inorganic pigment not having said pigment treatment composition coated thereon.

* * * * *